United States Patent
Sung et al.

(10) Patent No.: US 10,004,077 B2
(45) Date of Patent: Jun. 19, 2018

(54) METHOD AND APPARATUS FOR BEAM SWITCHING IN MOBILE COMMUNICATION NETWORK

(71) Applicant: ELECTRONICS AND TELECOMMUNICATIONS RESEARCH INSTITUTE, Deajeon (KR)

(72) Inventors: Nak Woon Sung, Daejeon (KR); Yong Seouk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 160 days.

(21) Appl. No.: 14/973,933

(22) Filed: Dec. 18, 2015

(65) Prior Publication Data
US 2016/0183234 A1    Jun. 23, 2016

(30) Foreign Application Priority Data
Dec. 19, 2014 (KR) .................. 10-2014-0184921

(51) Int. Cl.
*H04W 72/04* (2009.01)
*H04W 36/06* (2009.01)

(52) U.S. Cl.
CPC .......... *H04W 72/046* (2013.01); *H04W 36/06* (2013.01)

(58) Field of Classification Search
CPC ........................ H04W 72/046; H04W 36/06
See application file for complete search history.

(56) References Cited

U.S. PATENT DOCUMENTS

| | | | |
|---|---|---|---|
| 2011/0243080 A1* | 10/2011 | Chen ............... | H04W 74/0841 370/329 |
| 2012/0157141 A1 | 6/2012 | Lim et al. | |
| 2012/0236816 A1 | 9/2012 | Park et al. | |
| 2013/0028219 A1 | 1/2013 | Lee et al. | |
| 2014/0073329 A1 | 3/2014 | Kang et al. | |
| 2014/0073337 A1* | 3/2014 | Hong ............... | H04W 16/28 455/452.1 |
| 2014/0120926 A1* | 5/2014 | Shin ................ | H04W 56/00 455/450 |
| 2014/0153423 A1* | 6/2014 | Shin ................ | H04W 36/18 370/252 |

FOREIGN PATENT DOCUMENTS

| | | |
|---|---|---|
| KR | 2011-0061507 A | 6/2011 |
| KR | 2011-0117012 A | 10/2011 |
| KR | 2012-0070038 A | 6/2012 |
| KR | 10-2014-0034509 A | 3/2014 |

* cited by examiner

*Primary Examiner* — Christine Ng
(74) *Attorney, Agent, or Firm* — Rabin & Berdo, P.C.

(57) ABSTRACT

In a mobile communication network, after a target beam is determined based on signal intensity of a serving beam and a candidate beam, when the serving beam and the target beam are operated in the same base station, a terminal performs a beam switching procedure in a layer 2.

18 Claims, 6 Drawing Sheets

METHOD AND APPARATUS FOR BEAM SWITCHING IN MOBILE COMMUNICATION NETWORK

CROSS-REFERENCE TO RELATED APPLICATION

This application claims priority to and the benefit of Korean Patent Application No. 10-2014-0184921 filed in the Korean Intellectual Property Office on Dec. 19, 2014, the entire contents of which are incorporated herein by reference.

BACKGROUND OF THE INVENTION (a) Field of the Invention

The present invention relates to a method and apparatus for beam switching in a mobile communication network. More particularly, the present invention relates to a method and apparatus for beam switching in a mobile communication network using a millimeter wave (mmW) frequency band.

(b) Description of the Related Art

In general, for handover, a serving base station transmits a Radio Resource Control (RRC) connection reconfiguration message to a terminal to instruct a measurement control of the terminal. In this case, the RRC connection reconfiguration message includes measurement configuration information that sets measurement that the terminal is to perform.

The terminal measures Reference Signal Received Power (RSRP) or a Reference Signal Received Quality (RSRQ) based on measurement configuration information, and when RSRP or RSRQ of a neighbor cell is a threshold value or more, the terminal reports the measured RSRP or RSRQ value to a serving base station. Here, the RSRP represents average reception power of a cell-specific reference signal within a specific frequency bandwidth, and the RSRQ represents received reference signal quality. RSRP and RSRQ are used for a handover procedure in an RRC connected state, but RSRP is used for a cell selection or cell reselection procedure in an RRC idle state.

The serving base station determines whether to perform handover based on a measurement report from a terminal. When it is determined to perform handover, the serving base station transmits a handover request message to a target base station. Thereafter, the target base station performs admission control on whether to approve handover based on a handover request message. Therefore, even if a handover request of the serving base station exists, when approval of the target base station exists, handover is performed. For handover approval, the target base station transmits a handover request allowance message to the base station. The handover request allowance message includes handover approval information when handover is approved and handover rejection information when handover is rejected. When handover from the target base station is approved, the serving base station transmits a handover instruction message to the terminal to instruct handover. A phase from a handover determination time point to a time point that sends a handover instruction to a terminal is referred to as a handover preparation phase.

The terminal receives a handover instruction message and then performs an actual handover process. From this time, a handover execution phase is performed.

Thereafter, the terminal starts a procedure that performs handover from a serving base station to a target base station. The terminal performs a handover process after a random access procedure operation in a target base station to transmit a handover confirmation message to the target base station.

In such handover, even in frequent movement between beams within the same base station, because a handover procedure should be applied in an RRC layer corresponding to a layer 3 between base stations, there is a problem that a handover delay time increases. Further, because handover is always started by a base station, there is a problem that fast switching between beams is difficult and that a random access procedure should be performed using a Physical Random Access Channel (PRACH).

SUMMARY OF THE INVENTION

The present invention has been made in an effort to provide a method and apparatus for beam switching in a mobile communication network that can provide fast beam switching in the mobile communication network.

An exemplary embodiment of the present invention provides a method of switching a beam of a terminal in a mobile communication network operating a plurality of beams. The method includes: measuring signal intensity of a serving beam and a candidate beam; determining beam switching to a target beam based on signal intensity of the serving beam and the candidate beam; and changing, when the target beam and the serving beam operate in the same base station, beam access to the target beam through message exchange between MAC layers of the terminal and the base station.

The changing of beam access may include: acquiring predetermined information of an exclusive uplink competition-based channel that is allocated to the target beam in the MAC layer of the terminal from the target beam; transmitting a beam switching request message to a MAC layer of the target beam using the exclusive uplink competition-based channel; and receiving a beam switching Ack message from the MAC layer of the target beam.

The predetermined information may include a location of a radio resource of the exclusive uplink competition-based channel and downlink control information corresponding to each of a plurality of Contention Based-Radio Network Temporary Identifiers (CB-RNTIs), and the downlink control information may include radio resource information within the exclusive uplink competition-based channel.

The transmitting of a beam switching request message may include: selecting one random CB-RNTI of the plurality of CB-RNTIs; and transmitting the beam switching request message through a radio resource in which Downlink Control Information (DCI) corresponding to the selected CB-RNTI is represented.

The beam switching request message may include the selected CB-RNTI and a C-RNTI of the terminal.

The changing of beam access may further include retransmitting the beam switching request message, when the beam switching Ack message is not received within a predetermined time.

The changing of beam access may further include: performing, when it fails to receive the beam switching Ack message from a MAC layer of the target beam, a random access procedure and receiving uplink resource allocation information; transmitting a beam switching request message to a MAC layer of a target beam using the uplink resource allocation information; and receiving a beam switching Ack message from a layer 2 of the target beam.

The receiving of uplink resource allocation information may include: transmitting a random access preamble to a MAC layer of the target beam; and receiving a random access response to the random access preamble from the MAC layer of the target beam, wherein the random access response may include the uplink resource allocation information.

The changing of beam access may further include transferring, when receiving the beam switching Ack message, a beam switching instruction message from the MAC layer of the terminal to a Radio Resource Control (RRC) layer of the terminal.

The acquiring of predetermined information may include receiving a System Information Block (SIB) that is broadcasted from the target beam, wherein the SIB may include predetermined information of the exclusive uplink competition-based channel.

The method may further include changing, when the target beam and the serving beam are operated in different base stations, beam access to the target beam through message exchange between RRC layers of the terminal and the base station.

Another embodiment of the present invention provides a beam switching apparatus of a terminal in a mobile communication network operating a plurality of beams. The beam switching apparatus includes a beam switching determining unit and a beam switching controller. The beam switching determining unit determines beam switching to a target beam based on signal intensity of a serving beam and a candidate beam of the plurality of beams. The beam switching controller changes beam access to a target beam through message exchange between MAC layers of the terminal and a base station, when the target beam and the serving beam are operated in the same base station.

The beam switching controller may transmit a beam switching request message to a MAC layer of the target beam through an exclusive uplink competition-based channel that is allocated to the target beam and receive a beam switching Ack message from the MAC layer of the target beam.

The beam switching controller may acquire predetermined information of the exclusive uplink competition-based channel that is allocated to the target beam through system information that is broadcasted from the MAC layer of the target beam.

The predetermined information may include a location of a radio resource of the exclusive uplink competition-based channel and downlink control information corresponding to each of a plurality of Contention Based-Radio Network Temporary Identifiers (CB-RNTIs), and the downlink control information may include radio resource information within the exclusive uplink competition-based channel.

The beam switching controller may select one random CB-RNTI of the plurality of CB-RNTIs and transmit the beam switching request message through a radio resource in which Downlink Control Information (DCI) corresponding to the selected CB-RNTI is represented.

The beam switching controller may retransmit the beam switching request message when the beam switching Ack message is not received within a predetermined time.

The beam switching controller may receive uplink resource allocation information to transmit the beam switching request message by performing a random access procedure, when it fails to receive the beam switching Ack message from a MAC layer of the target beam.

The beam switching controller may change beam access to the target beam through message exchange between Radio Resource Control (RRC) layers of the terminal and the base station, when the target beam and the serving beam are operated in different base stations.

The plurality of beams each may include a physical layer and a MAC layer.

DETAILED DESCRIPTION OF THE EMBODIMENTS

Figure 1:
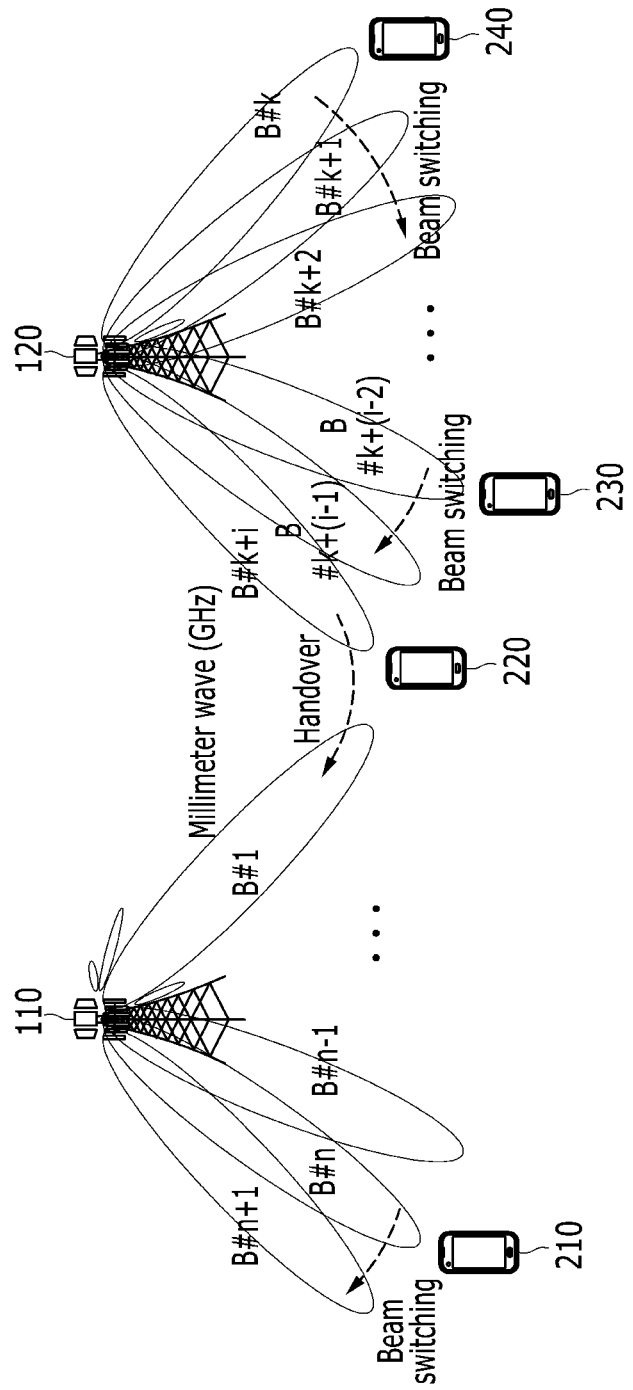
FIG. 1 is a diagram illustrating a multiple beam environment in a mobile communication network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in an entire specification and claims, unless explicitly described to the contrary, the word "comprise" and variations such as "comprises" or "comprising" will be understood to imply the inclusion of stated elements but not the exclusion of any other elements.

In the entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the MT, the MS, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a BS function, a relay node (RN) that performs a BS function, an advanced relay station (ARS) that performs a BS function, a high reliability relay station (HR-RS) that performs a BS function, and a small BS [a femto BS, a home node B (HNB), a home eNodeB (HeNB), a pico BS, a metro BS, and a micro BS], and may include an entire function or a partial function of the ABS, the nodeB, the eNodeB, the AP, the RAS, the BTS, the MMR-BS, the RS, the RN, the ARS, the HR-RS, and the small BS.

Hereinafter, a method and apparatus for switching a beam in a mobile communication network according to an exemplary embodiment of the present invention will be described in detail with reference to the drawings.

FIG. 1 is a diagram illustrating a multiple beam environment in a mobile communication network according to an exemplary embodiment of the present invention.

Referring to FIG. 1, the mobile communication network includes at least one of base stations 110 and 120 and at least one of terminals 210, 220, 230, and 240 that receive a service in a service area of the base stations 110 and 120.

For communication with the terminals 210, 220, 230, and 240 within a cell, the base stations 110 and 120 use a millimeter wave frequency band of 10 GHz or more, and operate a plurality of thin and accurate beams using beam-forming technology. For example, the base station 110 operates multiple beams B#1-B#n+1 within a cell. The base station 120 operates multiple beams B#k-B#k+i within a cell.

A service radius of respective beams B#1-B#n+1 and B#k-B#k+i is tens of meters, and may use a bandwidth of 1 GHz. Such respective beams B#1-B#n+1 and B#k-B#k+i may operate as an individual small base station. The small base station has smaller cell coverage than that of the base station 110, and is, for example, a base station in which cell coverage is tens of meters.

Multiple beams B#1-B#n+1 and B#k-B#k+i within the same base stations 110 and 120 have the same cell identifier and have different intrinsic beam identifiers. Further, respective beams B#1-B#n+1 and B#k-B#k+i within the same base stations 110 and 120 operate to provide the same uplink synchronization to a terminal within a cell. Thereby, upon initial access between beams, a procedure for acquiring a timing advance value through a random access procedure is not required. This can be performed because the base stations 110 and 120 operate in a wideband in view of a propagation characteristic, but have a small cell radius.

The base stations 110 and 120 may allocate an independent resource and radio channel to respective beams B#1-B#n+1 and B#k-B#k+i within a cell and transmit data to terminals of a corresponding beam area. That is, respective beams B#1-B#n+1 and B#k-B#k+i may independently operate a downlink physical channel and an uplink physical channel.

Further, respective beams B#1-B#n+1 and B#k-B#k+i broadcast system information, i.e., Master Information Block (MIB) and System Information Block (SIB) information. The MIB includes a basic parameter necessary when a terminal accesses a cell. The terminal may receive an SIB using a parameter that is received from the MIB. In SIB information, SIB 1 includes information related to cell access, and particularly, may include scheduling information of other SIBs, except for SIB 1.

When power is turned on, the terminals 210, 220, 230, and 240 may initially access one beam of multiple beams B#1-B#n+1 and B#k-B#k+i in which the base stations 110 and 120 operate and receive a service.

Because respective beams B#1-B#n+1 and B#k-B#k+i operate as each independent small base station, a procedure in which the terminals 210, 220, 230, and 240 access each beam may be the same as a procedure for accessing an existing base station. The terminals 210, 220, 230, and 240 access a target beam that provides a better propagation characteristic than that of a presently accessed serving beam upon moving to receive a service. When the target beam is a beam operating within the same base station as that of the serving beam, a movement from the serving beam to the target beam is referred to as beam switching. When the target beam is a beam operating in a different base station from that of the serving beam, a movement from the serving beam to the target beam is referred to as beam handover.

As shown in FIG. 1, as the number of beams increase, a movement between beams of the terminals 210, 220, 230, and 240 increases. In order to minimize service disconnection by movement between beams of the terminals 210, 220, 230, and 240, the base stations 110 and 120 control fast beam switching from the serving beam to the target beam.

According to an exemplary embodiment of the present invention, for fast beam switching from the serving beam to the target beam, when the target beam is a beam operating within the same base station as that of the serving beam, beam access of the terminals 210, 230, and 240 is changed according to a beam switching procedure of a layer 2.

However, when the target beam is a beam operating in a different base station from that of the serving beam, beam access of the terminal 220 is changed according to a handover procedure of a layer 3.

Figure 2:
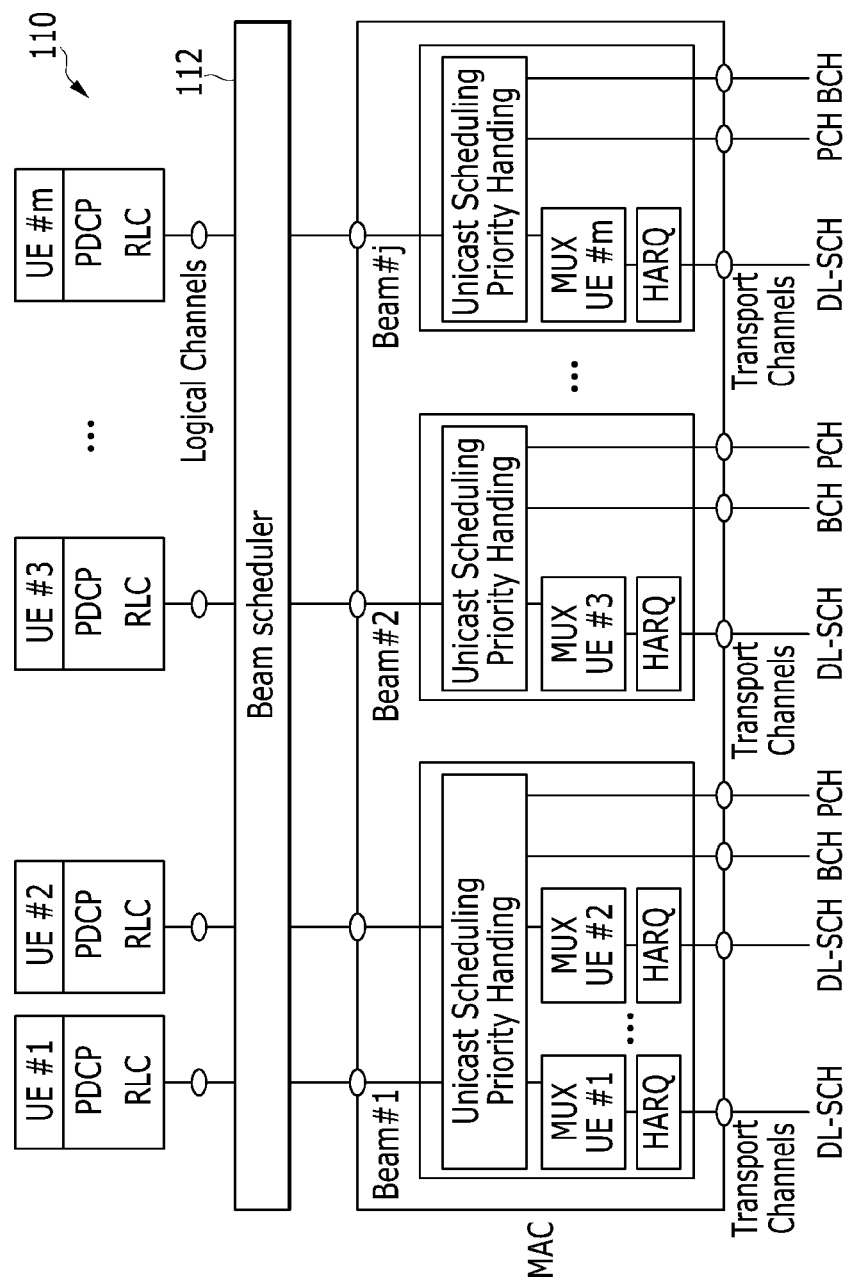
FIG. 2 is a diagram illustrating a beam scheduler of a base station of FIG.

FIG. 2 is a diagram illustrating a beam scheduler of a base station of FIG. 1. For convenience, FIG. 2 illustrates a beam scheduler 112 of the base station 110.

Referring to FIG. 2, a layer of the base station 110 is formed with a Physical (PHY) layer, a Media Access Control (MAC) layer, a Radio Link Control (RLC), Packet Data Convergence Protocol (PDCP), and Radio Resource Control (RRC) layer.

The RRC layer manages an RRC connection between respective terminals that are accessed to the base station 110. Further, the RRC layer manages radio bearers UE #1, UE #2, . . . , UE #m between respective terminals that access the base station 110.

The PDCP layer performs a security function and header compression. The RLC layer provides a segmentation and reassembly function and an Automatic Repeat request (ARQ) function for no error transmission.

The MAC layer includes the beam scheduler 112. The beam scheduler 112 maps a terminal that is accessed through beam scheduling to one of multiple beams B#1-B#n+1. Beams B#1-B#n+1 are each formed in a pair of a Physical (PHY) layer and a Media Access Control (MAC) layer.

The MAC layer performs a function of mapping various logical channels to various transmission channels, and performs a function of logical channel multiplexing that maps several logical channels to one transmission channel. The MAC layer is connected to a Radio Link Control (RLC) layer, which is a superordinate layer with a logical channel.

Further, the MAC layer allocates a radio resource to a terminal that is mapped to respective beams B#1-B#n+1 through a unicast scheduler within a beam and provides a service to a Radio Link Control (RLC) layer, which is a superordinate layer, through a logical channel. The MAC layer manages a priority of a terminal and a logical channel and provides a HARQ function. The PHY layer performs actual transmission/reception.

In this case, beam switching within the same base station is performed with message exchange of a layer 2 between a terminal and a base station, i.e., between MAC layers, and beam handover between different base stations is performed with message exchange of a layer 3 between a terminal and a base station, i.e., between RRC layers.

Figure 3:
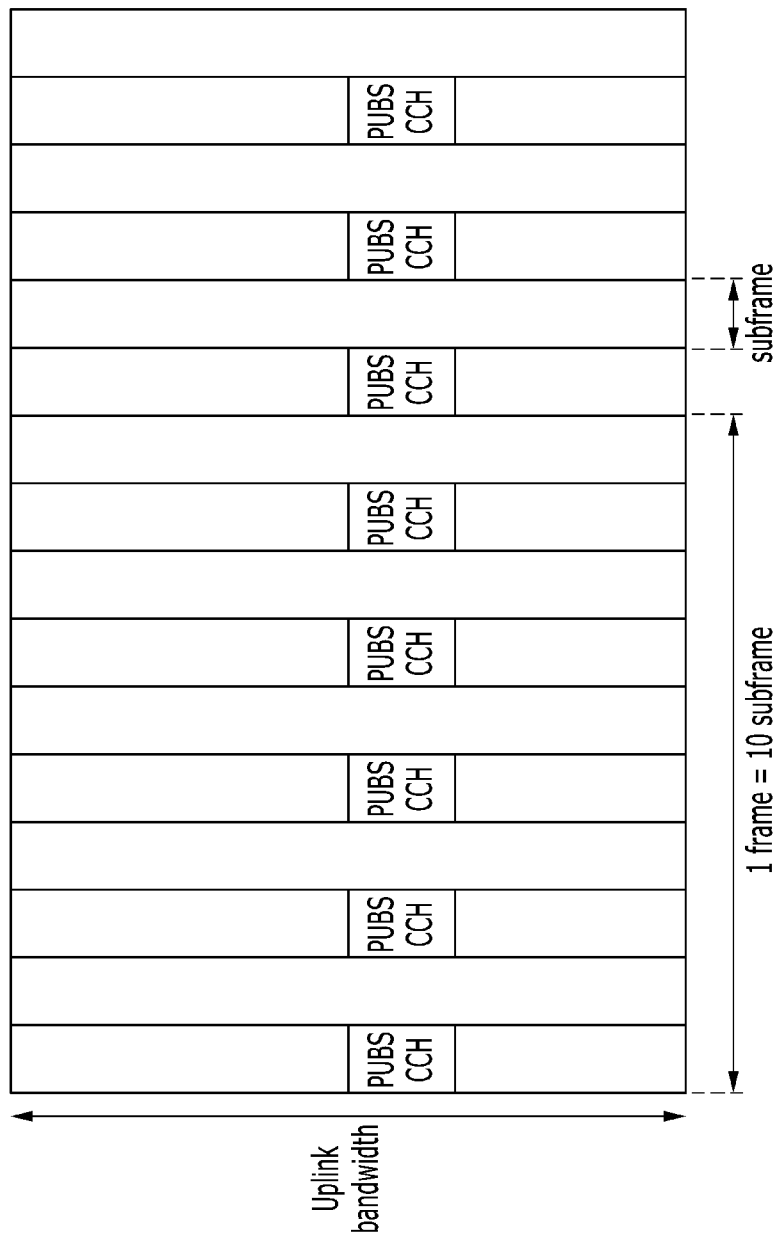
FIG. 3 is a diagram illustrating a competition-based uplink channel according to an exemplary embodiment of the present invention.

FIG. 3 is a diagram illustrating a competition-based uplink channel according to an exemplary embodiment of the present invention.

Referring to FIG. 3, the base stations 110 and 120 according to an exemplary embodiment of the present invention have a characteristic that they can provide a radio resource of a gigahertz band or more in view of a propagation characteristic, but they can provide a service to a small number terminals within coverage of a small cell that can have a line-of-sight. Such a characteristic is differentiated from an environment of an existing 3G/4G macro base station in which relatively many terminals compete within a cell while providing scarce radio resources and wide coverage. Therefore, in an exemplary embodiment of the present invention, when access between beams is changed within the same base stations 110 and 120, by reflecting a propagation characteristic of such base stations 110 and 120, an exclusive competition-based uplink channel, i.e., a Physical Uplink Beam Switching Control Channel (PUBSCCH) for beam switching is defined.

The PUBSCCH is an uplink resource block segment in which an entire terminal within a beam allows uplink transmission without a random access procedure. The base stations 110 and 120 each allocate a PUBSCCH on a beam basis, and the PUBSCCH may be defined within SIB2 or other SIB. Therefore, the terminals 210, 220, 230, and 240 may acquire SIB information by accessing a corresponding beam and use a PUBSCCH of a corresponding beam. In this case, all beams within each of the base stations 110 and 120 share a control channel, and a PUBSCCH within the same base stations 110 and 120 may be shared. That is, all beams within the same base stations 110 and 120 may use the same PUBSCCH.

In an exemplary embodiment of the present invention, a PUBSCCH does not allow transmission of general user traffic and signaling information, and may be formed with a fixed magnitude that can transmit a C-RNTI-based beam switching request message and a Buffer Status Report (BSR). In a general LTE system, upon transmitting uplink data, when a PUSCH resource does not exist, a terminal transmits a Scheduling Request (SR). A base station scheduler, having received the SR, provides uplink grant, i.e., uplink resource allocation information, to a corresponding terminal using Downlink Control Information (DCI) corresponding to a Cell-Radio Network Temporary Identifier (C-RNTI) through a Physical Downlink Control Channel (PDCCH). In this case, the DCI generally includes Modulation and Coding Scheme (MCS) information and size information of a transmitting block, and uplink resource allocation information that are used when transmitting data using the PUSCH. When receiving DCI corresponding to C-RNTI thereof, the terminal decodes corresponding DCI and thus transmits modulated and coded data to an allocated uplink radio resource.

In this case, a PUSCH is a non-contention-based physical uplink shared channel, however a PUBSCCH according to an exemplary embodiment of the present invention is a competition-based uplink channel. Uplink grant of the PUSCH is performed using DCI that is transferred to a random subframe through a PDCCH. However, in an exemplary embodiment of the present invention, uplink grant of the PUBSCCH is defined to SIB2. That is, SIB2 may include a location and an allocation cycle of an uplink radio resource necessary when using a PUBSCCH channel, and the above-described DCI. FIG. 3 illustrates an example of setting a PUBSCCH with two subframe cycles, and the predetermined cycle may be changed according to a location in which a corresponding cell is installed or the terminal user number.

DCI that is included in SIB2 is allocated using a Contention Based-Radio Network Temporary Identifier (CB-RNTI) value instead of a C-RNTI value. That is, radio resource allocation information within the PUBSCCH is defined using DCI, and in this case, each DCI corresponds one-to-one with a CB-RNTI. Therefore, each CB-RNTI may be used for identifying a plurality of uplink radio resources that each terminal may use within the PUBSCCH. Further, a priority may be given according to a CB-RNTI. In addition, a specific user group may be used for using only a radio resource corresponding to a specific CB-RNTI.

In an exemplary embodiment of the present invention, a plurality of CB-RNTIs may be allocated. This enables a plurality of radio resources to be allocated to a plurality of terminals through the PUBSCCH. Therefore, upon beam switching, each terminal may quickly transfer beam switching information through an exclusive uplink control channel, i.e., a PUBSCCH, instead of searching for a PDCCH, as in an SR request or the conventional art.

The terminal selects one random CB-RNTI from a plurality of CB-RNTIs that are instructed through SIB2 that is broadcasted from an accessed beam and transmits a beam switching request message through a radio resource in which DCI corresponding to the CB-RNTI represents.

Figure 4:
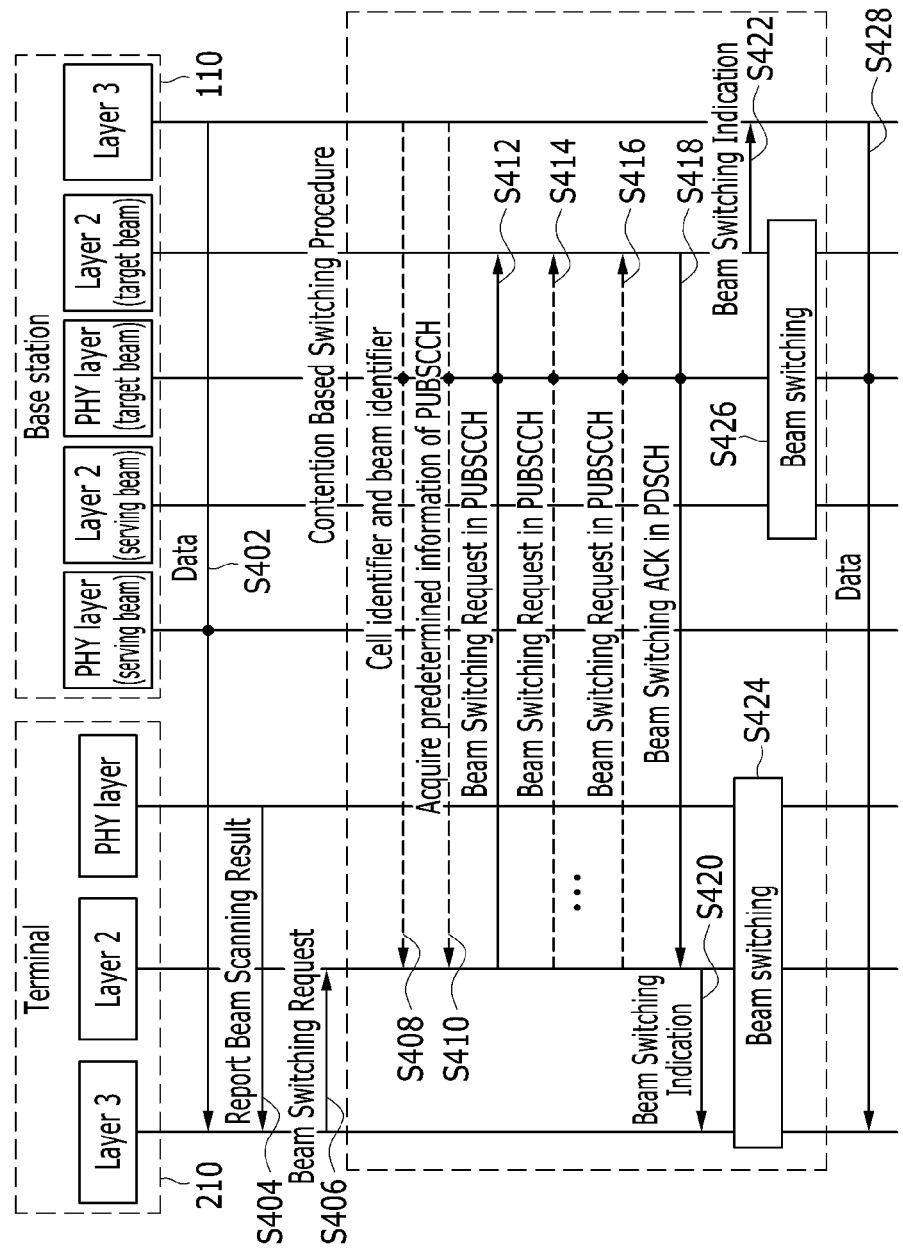
FIG. 4 is a message flow diagram illustrating a method of switching a beam according to an exemplary embodiment of the present invention.

FIG. 4 is a message flow diagram illustrating a method of switching a beam according to an exemplary embodiment of the present invention.

Referring to FIG. 4, when power is turned on, by accessing a specific beam within the base station 110, a terminal 210 may receive a service. In this case, the accessed beam is referred to as a serving beam. That is, the terminal 210 receives data through a PHY layer of a serving beam from the base station 110 (S402).

A PHY layer of the terminal 210 periodically transfers a beam list that is received by performing a multiple beam search and a received signal intensity measuring value to the layer 3 using a beam scanning result report (S404).

The layer 3 of the terminal 210 stores the received beam list and the received signal intensity measuring value. The layer 3 of the terminal 210 determines a target beam according to the received signal intensity measuring value.

When the target beam has better received signal intensity than that of the serving beam, the layer 3 of the terminal 210 determines beam switching to a target beam.

The layer 3 of the terminal 210 determines a cell identifier of the target beam and a cell identifier of a serving beam.

When a cell identifier of the target beam and a cell identifier of the serving beam are different, the layer 3 of the terminal 210 performs a handover procedure in the layer 3, as in a conventional case. However, when a cell identifier of the target beam and a cell identifier of a serving beam are the same, the layer 3 of the terminal 210 performs a beam switching procedure in the layer 2. In the beam switching procedure, the layer 2 performs a competition-based beam switching procedure.

When a cell identifier of the target beam and a cell identifier of the serving beam are the same, the layer 3 of the terminal 210 transmits a beam switching request message from the layer 2 for beam switching in the layer 2 (S406).

The layer 2 of the terminal 210, having received the beam switching request message from the layer 3 of the terminal 210 receives a Primary Synchronization Channel (P-SCH) and a Secondary Synchronization Channel (S-SCH) from a target beam to correspond synchronization with the target beam and acquires information of a cell identifier and a beam identifier (S408).

The layer 2 of the terminal 210 receives a physical broadcast channel through a target beam from the base station 110 and acquires broadcasting information within a cell.

The layer 2 of the terminal 210 in which an initial cell search is ended receives a Physical Downlink Shared Channel (PDSCH) according to a PDCCH and information that is loaded in the PDCCH, thereby acquiring predetermined information of the PUBSCCH through SIB2 (S410). Predetermined information of the PUBSCCH may include a radio resource location of the PUBSCCH, DCI corresponding to each of a plurality of CB-RNTIs, and an allocation cycle.

The layer 2 of the terminal 210 stores predetermined information of the PUBSCCH.

The layer 2 of the terminal 210 transmits a beam switching request message to the layer 2 of the target beam using the PUBSCCH of a target beam (S412). Specifically, the layer 2 of the terminal 210 may select one random CB-RNTI of a plurality of CB-RNTIs and transmit a beam switching request message through a radio resource in which DCI corresponding to the selected CB-RNTI represents. In this case, the beam switching request message includes the selected CB-RNTI and a C-RNTI value of the terminal 210.

The layer 2 of the target beam of the base station 110, having received the beam switching request message transmits a beam switching Ack message using the PDSCH for a corresponding C-RNTI value (S418).

The layer 2 of the terminal 210, having received the beam switching Ack message transfers a beam switching indication message to the layer 3 (S420).

Further, the layer 2 of the target beam of the base station 110 transfers a beam switching indication message including C-RNTI of the terminal 210 to the layer 3 of the base station 110 (S422).

The layer 3 of the terminal 210 executes beam switching with a target beam (S424), and the base station 110 executes beam switching with a target beam (S426). Thereby, a competition-based beam switching procedure is complete.

Thereafter, the layer 3 of the base station 110 transmits and receives data using a C-RNTI value (S428).

When a beam switching Ack message is not received from a target beam within a predetermined time, the layer 2 of the terminal 210 may retransmit the beam switching request message by the predetermined number (S414-S416).

Figure 5:
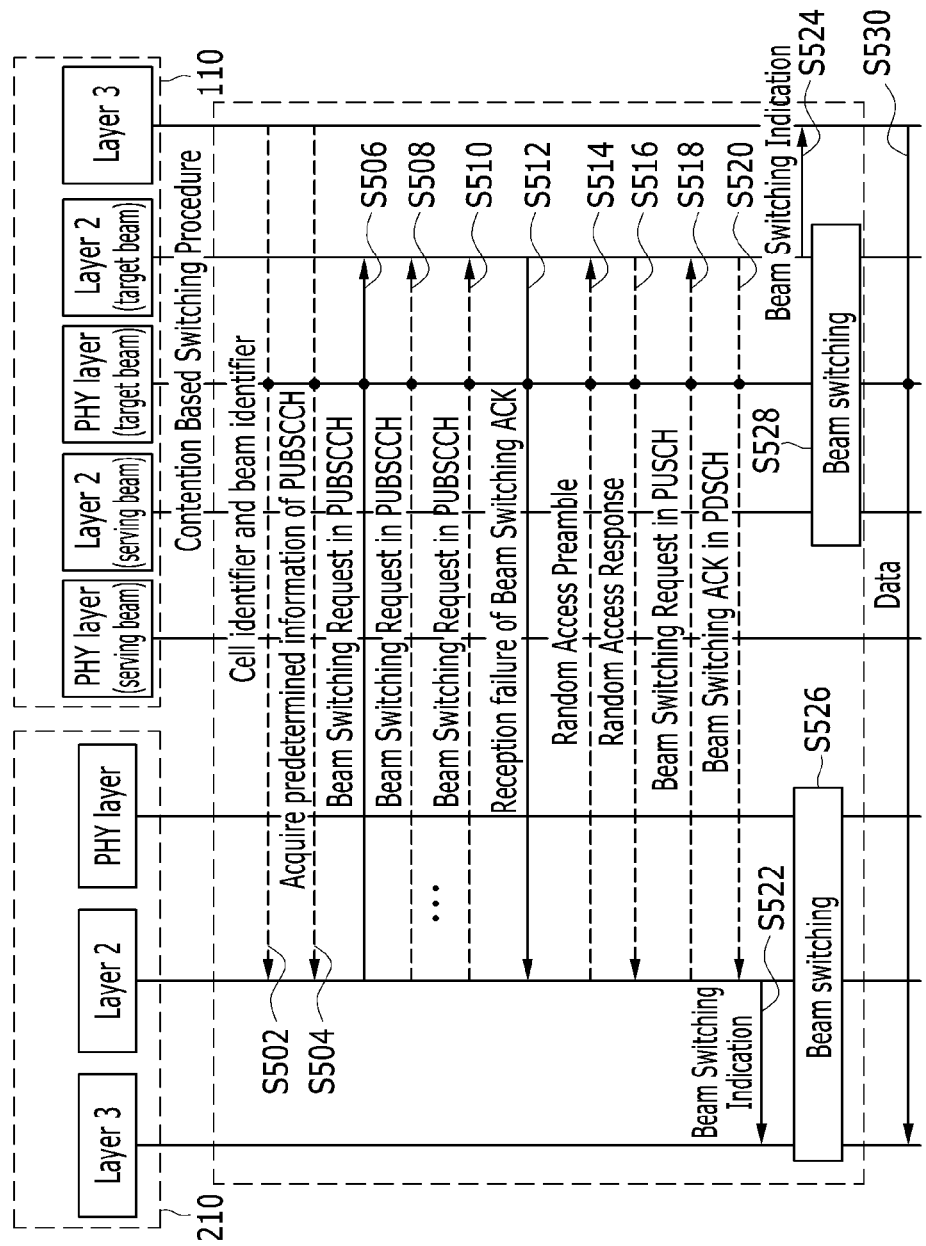
FIG. 5 is a message flow diagram illustrating a method of switching a beam according to another exemplary embodiment of the present invention.

FIG. 5 is a message flow diagram illustrating a method of switching a beam according to another exemplary embodiment of the present invention.

For convenience, FIG. 5 illustrates only a competition-based beam switching procedure, and even in a competition-based beam switching procedure, operation of steps S502-S510 is the same as operation of steps S408-S416 that are described with reference to FIG. 4 and thus a detailed description thereof will be omitted.

Referring to FIG. 5, when a layer 2 of a terminal 210 does not receive a beam switching Ack message from a target beam within a predetermined time, the layer 2 of the terminal 210 may retransmit a beam switching request message by the predetermined number (S508-S510).

Even when the layer 2 of the terminal 210 retransmits a beam switching request message by the predetermined number, if it fails to receive the beam switching Ack message (S512), the layer 2 of the terminal 210 performs a random access procedure and acquires an uplink transmission opportunity.

Specifically, the layer 2 of the terminal 210 transmits a random access preamble to a layer 2 of a target beam of the base station 110 (S514). The layer 2 of the target beam transmits a random access response to a random access preamble to the layer 2 of the terminal 210 (S516). The random access response may include UL grant information including uplink resource allocation information.

The layer 2 of the terminal 210 transfers a beam switching request message to the layer 2 of the target beam using a PUSCH, which is uplink resource allocation information (S518). In this case, the beam switching request message includes a C-RNTI value of the terminal 210.

The layer 2 of the target beam, having received the beam switching request message transmits a beam switching Ack message using a PDSCH for a corresponding C-RNTI value (S520).

The layer 2 of the terminal 210, having received the beam switching Ack message transfers a beam switching Indication message to a layer 3 (S522).

Further, the layer 2 of the target beam of the base station 110 transfers a beam switching indication message including C-RNTI of the terminal 210 to the layer 3 of the base station 110 (S524).

The layer 3 of the terminal 210 executes beam switching with a target beam (S526), and the base station 110 executes beam switching with the target beam (S528).

Thereby, a competition-based beam switching procedure is complete.

Thereafter, the layer 3 of the base station 110 transmits and receives data using a C-RNTI value (S530).

Figure 6:
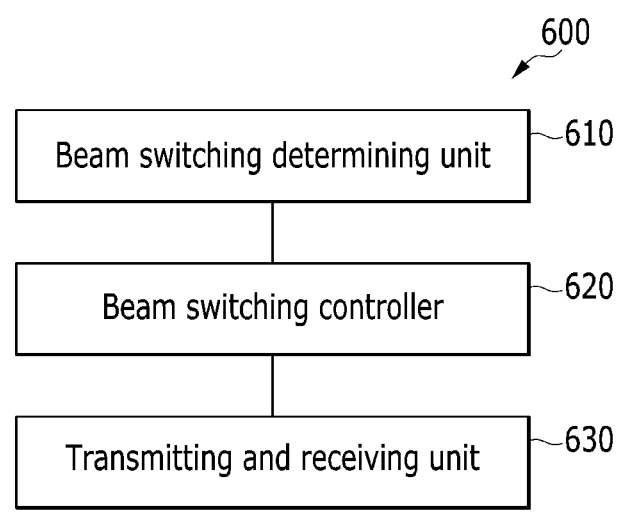
FIG. 6 is a block diagram illustrating a configuration of a beam switching apparatus of a terminal according to an exemplary embodiment of the present invention.

FIG. 6 is a block diagram illustrating a configuration of a beam switching apparatus of a terminal according to an exemplary embodiment of the present invention.

Referring to FIG. 6, a beam switching apparatus 600 includes a beam switching determining unit 610, a beam switching controller 620, and a transmitting and receiving unit 630.

The beam switching determining unit 610 determines beam switching to a target beam using a beam scanning result report that is received from a PHY layer.

When a cell identifier of a target beam and a cell identifier of a serving beam are different, the beam switching controller 620 performs a handover procedure in a layer 3, and when a cell identifier of a target beam and a cell identifier of a serving beam are the same, the beam switching controller 620 performs a beam switching procedure in a layer 2. Particularly, the beam switching controller 620 performs a competition-based beam switching procedure in a beam switching procedure in the layer 2. The beam switching controller 620 may perform a competition-based beam switching procedure that is described with reference to FIGS. 4 and 5.

The transmitting and receiving unit 630 transmits and receives a target beam and data of the base station 110, and may transmit and receive various messages or control signals or system information for competition-based beam switching.

At least a partial function of an apparatus and method for switching a beam of a terminal according to the foregoing exemplary embodiment of the present invention may be implemented with hardware, or may be implemented with software that is combined with hardware. For example, a processor that is implemented with a central processing unit (CPU) or other chipset and microprocessor may perform a function of the beam switching determining unit 610, and the beam switching controller 620 and a transceiver may perform a function of the transmitting unit and receiving unit 630.

According to an exemplary embodiment of the present invention, when changing access between beams operating within the same base station, fast access change between beams can be realized with switching between beams in a layer 2.

Further, in switching between beams within the same base station, because beam switching is determined by a terminal, a switching delay time between beams can be minimized, and in order to transmit a beam switching request message, by using an exclusive uplink competition-based channel, a beam switching delay time between the terminal and the base station can be minimized.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of switching a beam of a terminal in a mobile communication network operating a plurality of beams, the method comprising:
    measuring signal intensity of a serving beam and a candidate beam;
    determining beam switching to a target beam based on signal intensity of the serving beam and the candidate beam; and
    changing, when the target beam and the serving beam operate in a same base station, beam access to the target beam, through message exchange between MAC layers of the terminal and the base station using an exclusive uplink competition-based channel that is allocated to the terminal,
    wherein the changing of beam access comprises:
    acquiring predetermined information of the exclusive uplink competition-based channel that is allocated to the target beam in a MAC layer of the terminal from the target beam;
    transmitting a beam switching request message to a MAC layer of the target beam using the exclusive uplink competition-based channel; and
    receiving a beam switching Ack message from the MAC layer of the target beam.

2. The method of claim 1, wherein the predetermined information comprises a location of a radio resource of the exclusive uplink competition-based channel and downlink control information corresponding to each of a plurality of Contention Based-Radio Network Temporary Identifiers (CB-RNTIs), and
    the downlink control information comprises radio resource information within the exclusive uplink competition-based channel.

3. The method of claim 2, wherein the transmitting of a beam switching request message comprises:
    selecting one random CB-RNTI of the plurality of CB-RNTIs; and
    transmitting the beam switching request message through a radio resource in which Downlink Control Information (DCI) corresponding to the selected CB-RNTI is represented.

4. The method of claim 3, wherein the beam switching request message comprises the selected CB-RNTI and a CB-RNTI of the terminal.

5. The method of claim 1, wherein the changing of beam access further comprises retransmitting the beam switching request message, when the beam switching Ack message is not received within a predetermined time.

6. The method of claim 1, wherein the changing of beam access further comprises:
    performing, based on a failure to receive the beam switching Ack message from a MAC layer of the target beam, a random access procedure, and receiving uplink resource allocation information;
    transmitting a beam switching request message to a MAC layer of a target beam using the uplink resource allocation information; and
    receiving a beam switching Ack message from a layer 2 of the target beam.

7. The method of claim 6, wherein the receiving of uplink resource allocation information comprises:
    transmitting a random access preamble to a MAC layer of the target beam; and
    receiving a random access response to the random access preamble from the MAC layer of the target beam,
    wherein the random access response comprises the uplink resource allocation information.

8. The method of claim 1, wherein the changing of beam access further comprises transferring, when receiving the beam switching Ack message, a beam switching instruction message from the MAC layer of the terminal to a Radio Resource Control (RRC) layer of the terminal.

9. The method of claim 1, wherein the acquiring of predetermined information comprises receiving a System Information Block (SIB) that is broadcasted from the target beam, wherein the SIB comprises predetermined information of the exclusive uplink competition-based channel.

10. The method of claim 1, further comprising changing, when the target beam and the serving beam are operated in different base stations, beam access to the target beam through message exchange between Radio Resource Control (RRC) layers of the terminal and a base station operating the target beam.

11. A beam switching apparatus of a terminal in a mobile communication network operating a plurality of beams, the beam switching apparatus comprising:
    a processor configured to execute a beam switching determining unit that determines beam switching to a target beam based on signal intensity of a serving beam and a candidate beam of the plurality of beams; and
    a beam switching controller that changes beam access to a target beam through message exchange between MAC layers of the terminal and the base station using an exclusive uplink competition-based channel that is allocated to the terminal, when the target beam and the serving beam are operated in a same base station,
    wherein the beam switching controller transmits a beam switching request message to a MAC layer of the target beam through the exclusive uplink competition-based channel that is allocated to the target beam and receives a beam switching Ack message from the MAC layer of the target beam.

12. The beam switching apparatus of claim 11, wherein the beam switching controller acquires predetermined information of the exclusive uplink competition-based channel that is allocated to the target beam through system information that is broadcasted from the MAC layer of the target beam.

13. The beam switching apparatus of claim 12, wherein the predetermined information comprises a location of a radio resource of the exclusive uplink competition-based channel and downlink control information corresponding to each of a plurality of Contention Based-Radio Network Temporary Identifiers (CB-RNTIs), and the downlink control information comprises radio resource information within the exclusive uplink competition-based channel.

14. The beam switching apparatus of claim 13, wherein the beam switching controller selects one random CB-RNTI of the plurality of CB-RNTIs and transmits the beam switching request message through a radio resource in which Downlink Control Information (DCI) corresponding to the selected CB-RNTI is represented.

15. The beam switching apparatus of claim 11, wherein the beam switching controller retransmits the beam switching request message when the beam switching Ack message is not received within a predetermined time.

16. The beam switching apparatus of claim 11, wherein the beam switching controller receives uplink resource allocation information to transmit the beam switching request message by performing a random access procedure, based on a failure to receive the beam switching Ack message from a MAC layer of the target beam.

17. The beam switching apparatus of claim 11, wherein the beam switching controller changes beam access to the target beam through message exchange between Radio Resource Control (RRC) layers of the terminal and a base station operating the target beam, when the target beam and the serving beam are operated in different base stations.

18. The beam switching apparatus of claim 11, wherein the plurality of beams each comprise a physical layer and a MAC layer.

* * * * *